(12) United States Patent
Kanda

(10) Patent No.: US 8,001,869 B2
(45) Date of Patent: Aug. 23, 2011

(54) STRUCTURE FOR SUPPORTING AN UNLOCKING LEVER OF SEAT SLIDE DEVICE

(75) Inventor: Kenji Kanda, Akishima (JP)

(73) Assignee: Tachi-S Co., Ltd., Tokyo (JP)

( * ) Notice: Subject to any disclaimer, the term of this patent is extended or adjusted under 35 U.S.C. 154(b) by 161 days.

(21) Appl. No.: 12/407,323

(22) Filed: Mar. 19, 2009

(65) Prior Publication Data
US 2009/0178508 A1     Jul. 16, 2009

(30) Foreign Application Priority Data
Dec. 25, 2007   (JP) ................................ 2007-331679

(51) Int. Cl.
*G05G 1/00*     (2008.04)
(52) U.S. Cl. .......................................................... 74/491
(58) Field of Classification Search .................... 74/469, 74/491, 503, 519, 523, 527; 297/463.1; 248/201
See application file for complete search history.

(56) References Cited

U.S. PATENT DOCUMENTS

| | | | |
|---|---|---|---|
| 5,028,028 A * | 7/1991 | Yamada et al. ............... | 248/430 |
| 5,676,341 A * | 10/1997 | Tarusawa et al. ............ | 248/430 |
| 6,036,157 A * | 3/2000 | Baroin et al. ................. | 248/429 |
| 6,354,553 B1 * | 3/2002 | Lagerweij et al. ............ | 248/430 |
| 6,378,928 B1 * | 4/2002 | Downey ..................... | 296/65.13 |
| 6,902,235 B2 * | 6/2005 | Rohee et al. .................. | 297/334 |

FOREIGN PATENT DOCUMENTS

JP      2000-006694 A      1/2000

* cited by examiner

*Primary Examiner* — Vicky A Johnson
(74) *Attorney, Agent, or Firm* — Browdy and Neimark, PLLC

(57) ABSTRACT

A structure for supporting a generally U-shaped unlocking lever in seat slide device, wherein a main support portion of a generally channel cross-section is provided at each of a pair of the seat slide devices so as to support each of the two lateral portions of the unlocking lever. Formed respectively in the upper and lower walls of that main support portion are downwardly and upwardly curved protrudent portions, so that the two lateral portions of the unlocking lever each extends between those downwardly and upwardly curved protrudent portions. This arrangement gives a play to the two lateral portions of unlocking lever. Namely, both two free end portions respective of such two lateral portions are inclinable vertically relative to a support point between the afore-said two curved protrudent portions, while the two lateral portions themselves are also slidable therebetween in transverse direction of the seat slide device, thereby absorbing differences in size and shape which may occur in each of unlocking levers to be used.

5 Claims, 2 Drawing Sheets

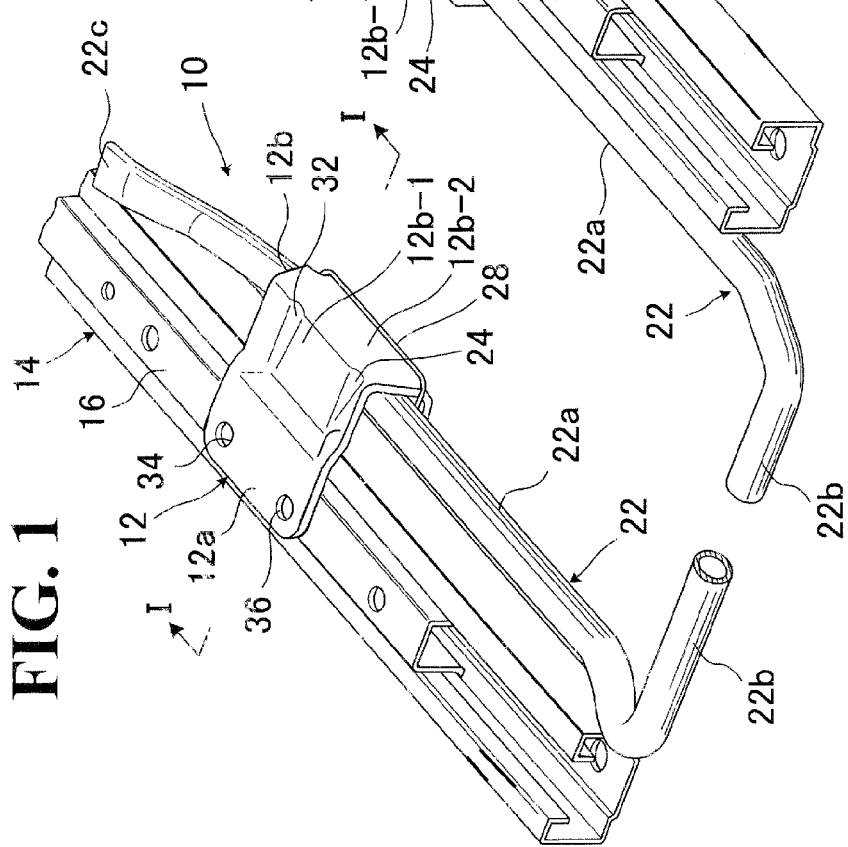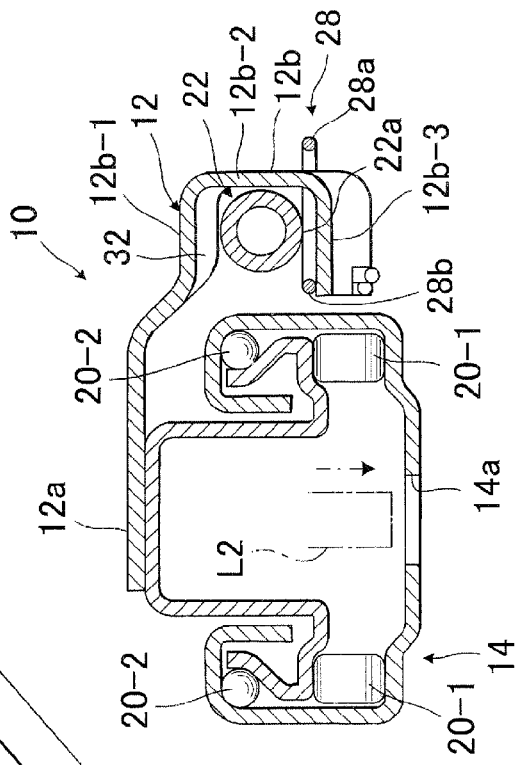

STRUCTURE FOR SUPPORTING AN UNLOCKING LEVER OF SEAT SLIDE DEVICE

BACKGROUND OF THE INVENTION

1. Field of the Invention

The present invention relates to a generally U-shaped unlocking lever which is vertically movable for causing unlocking operation of a lock mechanism associated with a seat slide device, wherein the seat slide device is adapted for allowing a seat to be adjustingly movable forwards and backwards via the upper and lower rails thereof. In particular, the invention is directed to a structure for supporting such generally U-shaped unlocking lever at the upper rail of the seat slide device.

2. Description of Prior Art

Various kinds of lock mechanisms are available for causing a seat slide device to be locked and unlocked at a given position. As well known, a pair of seat slide devices are operatively connected with a bottom side of a seat and operable for forward and backward adjustment of a seat. Each of the two seat slide devices comprises a lower rail fixed on a floor and an upper rail slidably fitted with the lower rail, wherein the upper rail is fixedly connected with a seat.

In most cases, a pair of lock mechanisms (known as a dual lock mechanism) are operatively attached to the foregoing pair of seat slide devices, respectively, to allow for stable locking and unlocking of the seat at a desired position. Hence, in order to cause synchronized and simultaneous operation of both two lock mechanisms of this kind, the Japanese Laid-Open Publication 2000-006694, for example, teaches use of a generally U-shaped unlocking lever which has a transverse handle portion for access to a seat occupant and a pair of lateral portions continuously extending from that transverse handle portion, wherein such pair of lateral portions are operatively connected with the afore-said two lock mechanisms, respectively. A seat occupant therefore can grasp the transverse handle portion with his or her hand and move the generally U-shaped unlocking lever in vertical direction to unlock both of the two lock mechanisms at the same time to release the seat slide device from a locked state.

In this sort of unlocking lever and dual lock mechanism, a pair of rotating holder brackets are normally provided to the respective afore-said two lateral portions of the generally U-shaped unlocking lever. In other words, those two lateral portions of the unlocking lever are rotatably connected, via such rotating holder brackets, with the two upper rails of seat slide devices, respectively.

In this regard, according to the foregoing Japanese prior art 2000-006694, a pair of support shafts are fixed to two upper rails associated with a pair of seat slide devices, and further a pair of rotating holder brackets are rotatably connected to the respective two support shafts, respectively. Such two rotating holder brackets are at their respective first ends firmly connected with the afore-said two lateral portions of the generally U-shaped unlocking lever, respectively, while being at their respective second ends operatively connected with the two lock mechanisms, respectively. Upward rotation of the unlocking lever causes downward rotation of the two second ends of that particular unlocking lever relative to the two support shafts via the two rotating holder brackets, thereby placing both two locking mechanisms in an unlocked state to release the seat slide device from locked state.

However, the above-described conventional structure has been with the following problems:

(i) If no coaxial alignment occurs between one and the other of the afore-said two support shafts due to errors in assembly, the generally U-shaped unlocking lever is not smoothly movable, and further, no synchronized operation of both two lock mechanisms can occur. To avoid such troubles, high precision and high expertise are required to locate and fix the two support shafts to the respective two upper rails associated with the two seat slide devices, which however will make the assembly of the lock mechanism and the unlocking lever in the seat slide device slower.

(ii) Since a great number of the generally U-shaped unlocking levers are provided for mass production processes, it is quite often the case that some of those levers are incorrectly formed with their respective lateral portions differing in angle and length from those of a required standard unlocking lever. In that case, since such incorrectly formed two lateral portions of the unlocking levers are fixed to the respective two rotating holder brackets, it is inevitable that the two rotating holder brackets will differ in angle from each other when they are fixedly connected with the respective two lateral portions of unlocking levers, which will result in no precise movement of the unlocking lever and no synchronized operation of the two lock mechanisms. Consequently, high precision and high expertise are required to form each unlocking lever correctly to a predetermined configuration. This will also make the assembling processes slower.

SUMMARY OF THE INVENTION

In view of the above-stated drawbacks, it is a purpose of the present invention to provide an improved structure for supporting an unlocking lever for a pair of seat slide devices, which is quite simplified in structure and effective in absorbing the above-discussed dimensional errors of the unlocking lever to insure stable and synchronized operation of two lock mechanisms for the pair of seat slide devices.

In order to achieve such a purpose, in accordance with the present invention, there is basically provided a structure for supporting a generally U-shaped unlocking lever in a pair of spaced-apart seat slide devices, each having a lower rail and an upper rail slidably engaged with said lower rail, in combination with a pair of lock mechanisms provided on said pair of spaced-apart seat slide devices, respectively, wherein said generally U-shaped unlocking lever has, defined therein, a transverse handle portion and a pair of lateral portions extending from respective two ends of said transverse handle portion, and wherein said pair of lateral portions are, at the respective two free ends thereof, operatively connected with said pair of lock mechanisms, respectively, said structure comprising:

a pair of support brackets, each having:

a base portion fixedly connected with said upper rail;

a main support portion formed integrally with said base portion, said main support portion being of a generally channel cross-section having an upper wall, a lower wall disposed under and opposite to said upper wall, and a vertical wall defined between said upper and lower walls, wherein said upper, lower and vertical walls define a space through which one of said pair of lateral portions of said generally U-shaped unlocking lever extend in a vertically movable manner;

a downwardly curved protruding portion formed in said upper wall of said main support portion so as to project downwardly of said particular upper wall;

an upwardly curved protruding portion formed in said lower wall of said main support portion so as to project upwardly of said particular lower wall;

wherein said downwardly and upwardly curved protruding portions are disposed in an opposed and spaced-apart relation with each other to provide upper and lower support points; and a dent means for preventing removal of said one of said pair of lateral portions of said generally U-shaped unlocking lever from said main support portion of said support bracket, wherein said pair of lateral portions of said generally U-shaped unlocking lever extend through the respective two main support portions respectively of said pair of support brackets, such that said transverse handle portion is positioned forwardly of said pair of seat slide devices with respect to the pair of support brackets, while said two ends respectively of said pair of lateral portions are positioned backwardly of said pair of seat slide devices with respect to said pair of support brackets, and such that said pair of lateral portions are each supported between said upper and lower support points so as to be inclinable vertically relative to said particular upper and lower support points within said main support portion of said support bracket, while being prevented by said dent means against removal from the respective two main support portions respectively of said pair of support brackets, and wherein, upon raising said transverse handle portion of said generally U-shaped unlocking lever relative to said main support portion of said support bracket, said two free ends respectively of said pair of lateral portions of said generally U-shaped unlocking lever are rotated downwardly relative to said upper and lower support points, thereby actuating both said pair of lock mechanism to unlock both said pair of seat slide devices.

As one aspect of the present invention, the afore-said pair of lock mechanisms each have an actuator lever portion, and an extension is formed in said free end of each of said pair of lateral portions of said generally U-shaped unlocking levers. Such extension is contacted on said actuator lever portion.

Other various effects and advantages will become apparent from reading of the description, hereinafter, with reference to the accompanied drawings.

BRIEF DESCRIPTION OF THE DRAWINGS

FIG. 1 is a is a partly broken perspective view showing a structure for supporting unlocking lever for seat slide device in accordance with the present invention;

FIG. 2 is a sectional view taken along the line I-I in the FIG. 1;

DETAILED DESCRIPTION OF PREFERRED EMBODIMENT OF THE INVENTION

Figure 3:
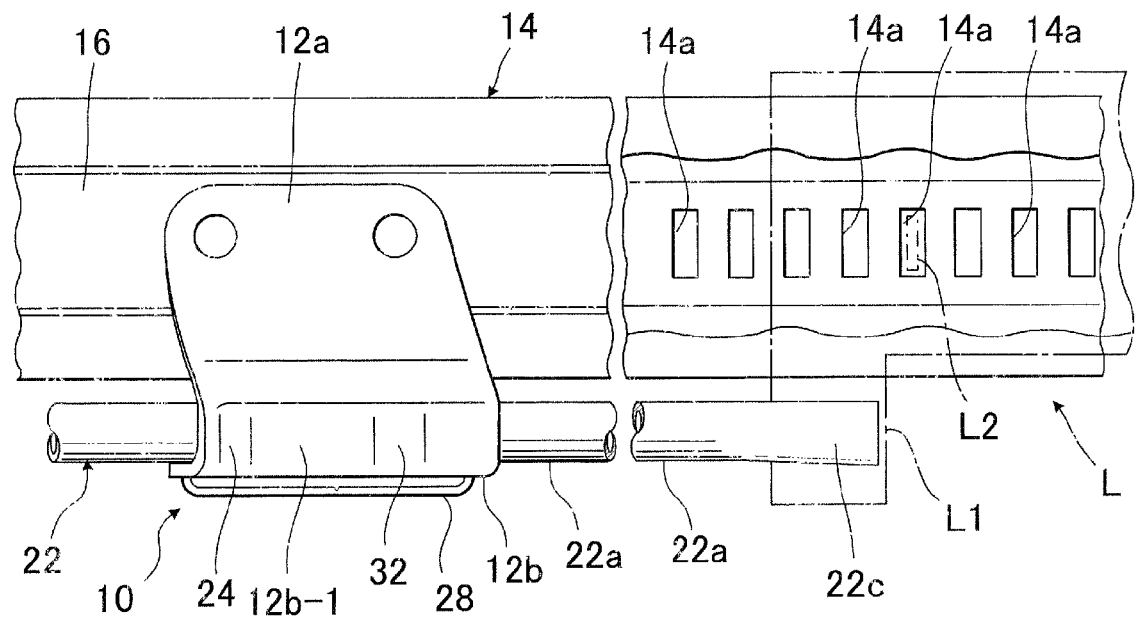
FIG. 3 is a partly broken plan view showing a principal part of the structure.

Referring to FIGS. 1 to 4, there is illustrated one exemplary embodiment of a structure for supporting a generally U-shaped unlocking lever (22) associated with a seat slide device in accordance with the present invention. In the Figures, such structure for supporting the unlocking lever (22) is generally designated by (10).

FIG. 1 shows a conventional seat slide device typically comprising a pair of spaced-apart rail assemblies (14) and (16), each being composed of an upper rail (16) and a lower rail (14). While not shown, but, as generally known in the art, the lower rail (14) is adapted for fixation upon a floor, whereas the upper rail (16) is adapted for connection with a seat and slidably engaged with the lower rail (14). As seen in FIG. 2 for example, the upper rail (16) may be slidably fitted in and along the lower rail (14), such that both two flange portions thereof are movably engaged, via upper balls (20-2) and lower rollers (20-1), with and along the respective two lateral guide passages of the lower rail (14). Thus, a seat (not shown) connected upon the upper rails (16) may be movable on and along the lower rails (14) to allow for adjustment in position of the seat in forward and backward directions.

As understandable from FIGS. 2 and 3, as with a conventional seat slide device, a conventional lock mechanism (L) is provided to permit locking and unlocking the upper rail (16) to and from the lower rail (14). As is known, the lock mechanism (L) includes: a plurality of lock holes (14a) formed in the bottom wall of the lower rail (14); a lock plate (L2) movable vertically towards and away from the lock holes (14a); and an actuator lever portion (L1) on which is contacted an actuator end portion (22c) associated with the generally U-shape unlocking lever (22) to be described later. According to this known lock mechanism (L), normally, the lock plate (L2) is engaged in one of the lock holes (14a) to place the upper rail (16) in a state locked to the lower rail (14), and, upon causing downward movement of the actuator lever portion (L1), the lock plate (L2) is disengaged from that one of the lock holes (14a) to release the upper rail (16) from the locked state, thereby allowing forward and backward moment of the upper rail (16) on and along the lower rail (14).

The foregoing seat slide device and lock mechanisms are well known in the art, and therefore, further specific description thereon is deleted for the sake of simplicity.

In accordance with the present invention, there are provided a pair of support brackets (12) and (12), each basically having, defined therein, a base plate portion (12a) and a main support portion (12b) of a generally channel cross-section. Further, in the present invention, a generally U-shaped unlocking lever (22) is provided, which is basically formed in conventional manner, but has a pair of flat extensions (22c) and (22c) formed integrally therewith. As will become apparent later, the support brackets (12) provide a support point for normally retaining the unlocking lever (22) at an inoperative position, while allowing the same to be movable in vertical direction relative thereto for actuation of the lock mechanism (L). The flat extensions (22c) of unlocking lever (22) also form a principal part of the present invention in combination with the support brackets (12).

Since the two support brackets (12) are identical to each other in structure and function, a specific description will be made only with regard to the left-side support bracket (12) as viewed from FIG. 1 and with reference to FIGS. 2 to 4.

According to the illustrated configuration of support bracket (12), the main support portion (12b) thereof itself is of a generally channel cross-section and formed by: an upper horizontal wall (12b-1); a lower sloped wall (12b-3); and a vertical wall (12b-2) integrally defined between those upper and lower walls (12b-1) and (12b-3).

Figure 4:
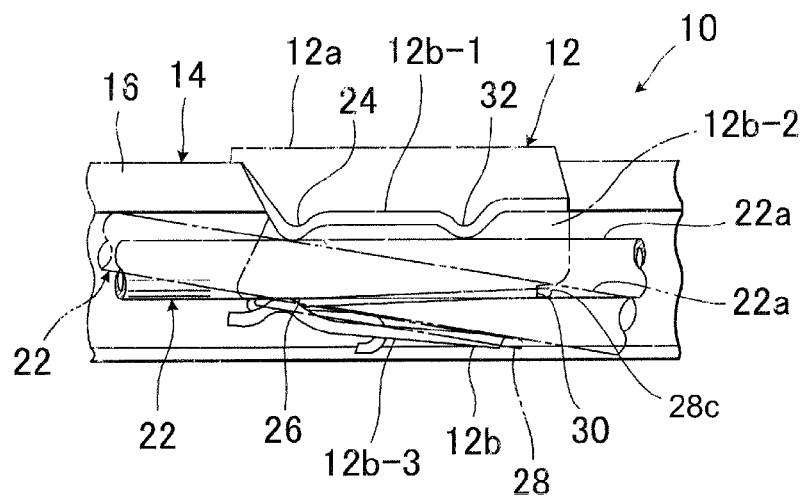
FIG. 4 is partly broken side view part in section, which shows a principal part of the structure.

As best shown in FIG. 4, the lower sloped wall (12b-3) is inclined downwardly as it proceeds from one right-side lateral end thereof towards another left-side lateral end thereof, and therefore, it is to be seen that an opening defined between the two left-side lateral ends respectively of the upper horizontal wall (12b-1) and lower sloped wall (12b-3) is larger than an opening defined between the two right-side lateral ends respectively of those two particular walls (12b-1) (12b-3).

The base plate portion (12a) of the support bracket (12) extends outwardly from and continuous with the afore-said upper horizontal wall (12b-1) of main support portion (12b), as shown.

As best seen in FIG. 4, defined in the upper horizontal wall (12b-1) are a pair of spaced-apart downwardly curved protruding portions (24) and (32) (hereinafter, first and second concave regions (24) and (32)), each having a downwardly arcuate cross-section which therefore projects inwardly and downwardly of the upper horizontal wall (12b-1). The first concave region (24) extends transversely of and over the entire width of the upper horizontal wall (12b-1), and is disposed adjacent to one lateral end of that upper horizontal wall (12b-1). The second concave region (32) also extends transversely of and over the entire width of the upper horizontal wall (12b-1), in a parallel relation with the first concave region (24). This second concave region (32) is disposed near to another lateral end of the upper horizontal wall (12b-1) opposite to the afore-said one lateral end of that particular upper horizontal wall, as can be readily understood from all the Figures.

Both first and second concave regions (24) and (32) are formed in the same dimensions. That is, the first and second concave regions (24) and (32) are identical to each other in arcuate cross-section and length. In particular, both downwardly arcuate cross-sections of those two concave regions (24) (32) are identical in curvature to each other, wherein the curvature is defined along the circumference of a circle having a predetermined diameter. Therefore, it is to be seen that the first and second concave regions (24) and (32) provide a pair of identical semi-columnar protruding portions toward the inward surface of the upper horizontal wall (12b-1) and that those two semi-columnar protruding portions (24) and (32) project downwardly from the inner surface of the upper horizontal wall (12b-1) and extend in a direction transversely of that upper horizontal wall (12b-1), such that the top portion of the first concave region (24) lies in the same level with and in parallel with the top portion of the second concave region (32), as best seen in FIG. 4, thereby providing two transversely extending parallel support points with which the longitudinally extending lateral portion (22a) of the generally U-shaped unlocking lever (22) is in contact, when the unlocking lever (22) is normally located at an inoperative position.

On the other hand, an upwardly curved protruding portion (26) (hereinafter, third concave region (26)) is defined in the lower sloped wall (12b) at a point corresponding to the first concave region (24). As viewed from FIG. 4, the third concave region (26) is disposed adjacent to one left-side lateral end of the lower sloped wall (12b) and has an upwardly arcuate cross-section as opposed to the downwardly arcuate cross-section of each of the first and second concave regions (24) (32). Namely, the third concave region (26) projects upwardly and inwardly from the inner wall of the lower sloped wall (12b) and extends in a direction transversely of that lower sloped wall (12b) as well as in a parallel relation with the first concave region (24).

Here, it is important that a distance between the first and third concave regions (24) and (26) is substantially identical to or slightly larger than an outer diameter of the lateral portion (22a) of the generally U-shaped unlocking lever (22), so as to allow that lateral portion (22a) to pass through between the first and third concave regions (24) (26) in a slight contact therewith.

With regard to the vertical wall (12b-2), due to the above-described arrangement of the upper horizontal wall (12b-1) and lower sloped wall (12b-3), the vertical wall (12b-2) per se is shown by the one-dot chain lines of FIG. 4 to be of such a configuration that becomes divergent as it proceeds in a direction from the left end thereof where the first and third concave regions (24) (26) lie in proximity thereto, towards the right end thereof where the second concave region (32) lies in proximity thereto.

Accordingly, the thus-constructed main support portion (12b) of support bracket (12) is provided with:

one small opening defined at one lateral end thereof (on the left side) where the first and third concave regions (24) and (26) lie adjacently and project inwardly of the main support portion (12b) in a mutually opposed relation;

another large opening defined at the other lateral end thereof (on the right side opposite to the afore-said one lateral end, where the second concave region (32) lies adjacently and project inwardly and downwardly of the main support portion (12b); and a divergent inner space defined by the three walls (12b-1, 12b-2 and 12b-3), which becomes larger in space in a direction from the afore-said one small opening towards the afore-said another large opening.

The above-described support bracket (12) is at the base plate portion (12a) thereof fixedly attached on the top surface of the upper rail (16) of seat slide device (14), by means of bolts and nuts securely engaged together via the two securing holes (34) and (36) formed in the base plate portion (12a), for example. In this regard, as shown in FIG. 2, the main support portion (12b) is situated inwardly and laterally of the seat slide device (14) and disposed within the height-wise range of the upper and lower rails (14) (16).

Designation (28) denotes a spring adapted for normally biasing the generally U-shaped unlocking lever (22) to an inoperative position, while preventing the same against removal from the support bracket (12). As understandable from all the Figures, the spring (28) is formed by bending a wire spring in a substantially long epical configuration including: a pair of spaced-apart lateral portions (28a) and (28b); and one end portion (28c). Basically, a substantially whole of the spring (28) is securely arranged in the main support portion (12b) of support bracket (12) so as to surround the vertical wall (12b-2) of that main support portion (12b) and extend in a slightly upward direction from a horizontal line with respect to the main support portion (12b). As shown in FIG. 2, one lateral portion (28a) of the spring (28) extends outside and alongside of the vertical wall (12b-2), while the other lateral portion (28b) thereof extends inside of vertical wall (12b-2). Though not shown, the spring (28) has one end securely connected with a proper securing portion of the lower sloped wall (12b-3).

As shown in FIG. 4, the spring (28) also has another end (28c) adapted for secure connection with a securing notch (30) formed in the lateral portion (22a) of the unlocking lever (22) for the purpose of preventing removal of the unlocking lever (22) from the support bracket (12).

As illustrated, a predetermined local area of the lateral portion (22a) of the generally U-shaped unlocking lever (22) passes through and is supported by the above-described main support portion (12b), with the securing notch (30) thereof being securely engaged with the afore-said another end (28c) of the spring (28). Hence, the unlocking lever (22) is attached to the pair of seat slide devices (14), via the respective two support brackets (12), such that the spring (28) not only biases the unlocking lever (22) to an inoperative position in the support bracket (12), but also prevents the same against removal therefrom.

The lateral portion (22a) of unlocking lever (22) is only contacted and retained between the downwardly protruding top portion of the first concave region (24) and the upwardly protruding top portion of the third concave regions (26). Thus, the lateral portion (22a) has a point contact relation with those two concave regions (24) (26), which establishes a support point, relative to which the lateral portion (22a) is rotatable in a vertical direction. Namely, referring to FIG. 4, when a user grasps and moved the transverse handle portion (22b) of the unlocking lever (22) upwardly, the lateral portion (22a) is rotated downwardly relative to the afore-said support point between the first and third concave regions (24) (26) in a direction from the normal inoperative position indicated by the solid line towards the downwardly inclined operative position indicated by the two-dot chain line.

The free end of the lateral portion (22a) is formed with a flat extension (22b) in an integral manner. This flat extension (22b) is formed by press working to have the shown flat shape. As shown in FIG. 3, the flat extension (22b) is contacted on the actuator lever portion (L1) of lock mechanism (L) which has been described previously.

Therefore, it is to be seen that, when a user raises the transverse handle portion (22b) of unlocking lever (22) upwardly, both two lateral portions (22a) of that unlocking lever (22) are rotated downwardly relative to the two respective support points (explained above) defined in the respective two support brackets (12), with the result that the two flat extensions (22c) of the unlocking lever (22) are simultaneously moved downwardly to press and lower the respective two actuator lever portions (L1) of lock mechanism (L). Upon the actuator lever portions (L) being lowered, the lock plate (L2) is disengaged from lock hole (14a), thereby releasing both two slide devices (14) from a locked state.

With the above-described structure, in accordance with the present invention, it is to be appreciated that the following effects and advantages are attainable:

(i) In assembly, a worker simply inserts both two lateral portions (22a) of known unlocking lever (22) through the respective two support brackets (12) of the present invention, until the two flat extensions (22c) are contacted on the respective two actuator lever portions (L1) of known lock mechanisms. Each lateral portion (22a) is rotatable vertically relative to the above-described support point (i.e., a point contact area) defined between the first and third concave regions (24) and (26). Thus, there is no need for providing a conventional shaft for rotatably supporting each of the lateral portions (22) of unlocking lever and no need for fixing such shaft to the upper rail (16).

(ii) By the virtue of such arrangement stated in (i) above, even when the two lateral portions (22a) are incorrectly formed longer or shorter than a predetermined length thereof in assembly, there is no problem for synchronized operation of the two lock mechanism (L). This is because, first, the aforementioned support points, relative to which the respective two lateral portions (22) are rotatable vertically, are defined at a fixed position in the support bracket (12) and thus remain unchanged in position, while permitting slidable movement of the respective two lateral portions (22a) therethrough, thereby absorbing the incorrect length of each of the two lateral portions (22a) of unlocking lever (22), and second, depending on such difference in length of the lateral portion (22a), the flat extension (22c) formed integrally with each of the two lateral portions (22a) may be adjustably displaced relative to the actuator lever portion (L1) of lock mechanism (L) and properly contacted thereon, which also absorbs the incorrect length of each of the two lateral portions (22a).

(ii) Further, all the first, second and third concave regions (24, 26 and 32) extend transversely of the main support portion (12b) of support bracket (12) to provide transversely increased support points to each lateral portion (22a) of unlocking lever. Namely, even when the two lateral portions (22a) are incorrectly bent from the transverse portion (22b) in assembly, which means that the two lateral portions (22a) happen to be bent inwardly or outwardly away from a predetermined rectilinear line with respect to the transverse portion (22b), the transverse formation of the foregoing three concave regions (24), (26) and (32) absorbs such incorrect bent state of each lateral portion (22a).

While having described the present invention thus far, it should be understood that the invention is not limited to the illustrated embodiment, but any other modification, replacement, and addition may be applied thereto without departing from the scopes of the appended claims.

What is claimed is:

1. A structure for supporting a generally U-shaped unlocking lever in a pair of spaced-apart seat slide devices each having a lower rail and an upper rail slidably engaged with said lower rail, in combination with a pair of lock mechanisms provided on said pair of spaced-apart seat slide devices, respectively, wherein said generally U-shaped unlocking lever has, defined therein, a transverse handle portion and a pair of lateral portions extending from respective two ends of said transverse handle portion, and wherein said pair of lateral portions are, at the respective two free ends thereof, operatively connected with said pair of lock mechanisms, respectively, said structure comprising:

a pair of support brackets, each having:

a base portion fixedly connected with said upper rail;

a main support portion formed integrally with said base portion, said main support portion being of a generally channel cross-section having an upper wall, a lower wall disposed under and opposite to said upper wall, and a vertical wall defined between said upper and lower walls, wherein said upper, lower and vertical walls define a space through which one of said pair of lateral portions of said generally U-shaped unlocking lever extend, such that said one of said pair of lateral portions is movable vertically within said space;

a downwardly protruding portion having a curved cross-section, which is formed in said upper wall of said main support portion, said downward protruding portion projecting in a direction downwardly of said upper wall;

an upwardly protruding portion having a curved cross-section, which is formed in said lower wall of said main support portion, said upwardly protruding portion projecting in a direction upwardly of said lower wall;

wherein said downwardly and upwardly protruding portions are disposed in an opposingly facing and spaced-apart relation with each other; and wherein said one of said pair of lateral portions of said generally U-shaped unlocking lever is contacted with both said upward and downwardly protruding portions, so as to be movably sandwiched between said upwardly and downwardly portions, such that said upwardly protruding portion provides a lower support contact point to said one of said pair of lateral portions, whereas said downwardly protruding portion provides an upper support contact point to said one of said pair of lateral portions;

a spring element for preventing removal of said one of said pair of lateral portions of said generally U-shaped unlocking lever from said main support portion of said support bracket, wherein said pair of lateral portions of said generally U-shaped unlocking lever extend through the respective two main support portions respectively of said pair of support brackets, such that said transverse handle portion is positioned forwardly of said pair of seat slide devices with respect to the pair of support brackets, while said two ends respectively of said pair of lateral portions are positioned backwardly of said pair of seat slide devices with respect to said pair of support brackets, and such that said pair of lateral portions are each supportively sandwiched between said upwardly and downwardly protruding portions of the respective one of said two main support portions so as to be inclinable vertically relative to said upwardly and downwardly protruding portions within said main support portion of said support bracket, while being prevented by said spring element against removal from the respective two main support portions respectively of said pair of support brackets, and wherein, upon raising said transverse handle portion of said generally U-shaped unlocking lever relative to said main support portion of said support bracket, said two free ends respectively of said pair of lateral portions of said generally U-shaped unlocking lever are rotated downwardly relative to said upwardly and downwardly protruding portions, thereby actuating both said pair of lock mechanism to unlock both said pair of seat slide devices.

2. The structure as claimed in claim 1, wherein said pair of lock mechanisms each has an actuator lever portion, wherein an extension is formed in said free end of each of said pair of lateral portions of said generally U-shaped unlocking levers, and wherein said extension is contacted on said actuator lever portion.

3. The structure as claimed in claim 1, wherein said downwardly protruding portion is so formed so as to extend transversely of said upper wall of said main support portion, whereas on the other hand, said upwardly protruding portion is formed so as to extend transversely of said lower wall of said main support portion, so that said upper and lower support points are increased in a direction transversely of each of said pair of lateral portions of said generally U-shaped unlocking lever.

4. The structure as claimed in claim 1, which further comprises said spring element for biasing said generally U-shaped unlocking lever to an inoperative position, such that said transverse handle portion of said generally U-shaped unlocking lever is biased by said spring element downwardly relative to the two main support portions respectively of said pair of said support brackets, with both free ends of said pair of lateral portions of said generally U-shaped unlocking lever being biased upwardly to a position inoperative to the respective said pair of lock mechanisms.

5. The structure as claimed in claim 1, which further comprises:
  another downwardly protruding portion having a curved cross-section which is formed in said upper wall of said main support portion of each of said pair of support brackets at a point distant from said downwardly protruding portion and facing backwardly of said seat slide devices with respect to said main support portion, wherein said another downwardly protruding portion projects in a direction downwardly of said upper wall and is configured to limit upward movement of said lateral portion of said generally U-shaped unlocking lever; and
  a pair of securing portions defined in said base portion of each of said pair of support brackets, such that one of said pair of securing portions is disposed substantially in correspondence with said downwardly protruding portion and the other of said pair of securing portions is disposed substantially in correspondence with said another downwardly protruding portion, wherein said base portion of each of said pair of support brackets is fixedly connected with said upper rail at said pair of securing portions.

* * * * *